(12) United States Patent
Murata et al.

(10) Patent No.: US 7,268,813 B2
(45) Date of Patent: Sep. 11, 2007

(54) SOLID STATE IMAGING APPARATUS

(75) Inventors: Takahiko Murata, Osaka (JP); Takumi Yamaguchi, Kyoto (JP); Toshiya Fujii, Shiga (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 725 days.

(21) Appl. No.: 10/764,452

(22) Filed: Jan. 27, 2004

(65) Prior Publication Data
US 2004/0183929 A1    Sep. 23, 2004

(30) Foreign Application Priority Data
Jan. 28, 2003    (JP)    ............................. 2003-018143

(51) Int. Cl.
*H04N 3/335*    (2006.01)
(52) U.S. Cl. ...................................... 348/274; 348/272
(58) Field of Classification Search ............ 348/218.1, 348/219.1, 272–280
See application file for complete search history.

(56) References Cited
U.S. PATENT DOCUMENTS 4,460,919 A    7/1984    Takemura 4,553,159 A *    11/1985    Moraillon .................... 348/280
6,686,960 B2 *    2/2004    Iizuka ......................... 348/273
6,930,716 B2 *    8/2005    Yoshida ....................... 348/322
6,992,714 B1 *    1/2006    Hashimoto et al. ......... 348/273

FOREIGN PATENT DOCUMENTS
JP    2001-292453 A    10/2001

* cited by examiner

*Primary Examiner*—David Ometz
*Assistant Examiner*—Tuan Le
(74) *Attorney, Agent, or Firm*—McDermott Will & Emery LLP

(57) ABSTRACT

A solid state imaging apparatus includes a plurality of pixels two-dimensionally arranged in the row direction and the column direction, and every two of the plurality of pixels that are adjacent to each other in the row direction or the column direction include color filters of different colors, respectively. A signal mixture circuit is provided in each same-row and same-color pixel group. Each said same-row and same-color pixel group consisting of ones of the plurality of pixels which are included in a pixel mixture unit to be a subject of pixel signal mixture, which are located in the same row, and which include color filters of the same color. The signal mixture circuit includes a combination of a capacitor and a transmission switch, stores pixel signals from pixels included in a same-row and same-color pixel group and mixes the signals together.

4 Claims, 9 Drawing Sheets

SOLID STATE IMAGING APPARATUS

BACKGROUND OF THE INVENTION

The present invention relates a solid state imaging apparatus which includes a plurality of pixels two-dimensionally arranged in the row direction and the column direction and in which every two of the plurality of pixels that are adjacent to each other in the row direction or the column direction include color filters of different colors, respectively.

In recent years, as an exemplary solid state imaging apparatus, for example, a device shown in FIG. 8 has been known (see Japanese Patent Publication No. 2001-292453).

Hereinafter, the known solid state imaging apparatus described in the above-described publication will be described with reference to FIG. 8.

As shown in FIG. 8, a plurality of pixels are two-dimensionally arranged in the row direction and the column direction. Colors (R, G or B) of color filters in two rows or two columns as a unit appear repeatedly. And sixteen pixels included in an area consisting of four rows and four columns make up. Note that each pixel addition group does not overlap with any other pixel addition group in the row direction and the column direction. In each pixel addition group, the reference numeral 101 denotes a first G using range in which a color filter (G) is used, the reference numeral 102 denotes a B using range in which a color filter (B) is used, the reference numeral 103 denotes an R using range in which a color filter (R) is used, and the reference numeral 104 denotes a second G using range in which a color filter (G) is used.

FIG. 9 illustrates a circuit for adding pixel signals generated in the solid state imaging apparatus of FIG. 8.

First, signals of a pixel 105 and a pixel 106 which are included in the first G using range are stored in a capacitor 107 and a capacitor 108 in FIG. 9, respectively, and then a switch 109 made of an MOS transistor is conducted, so that the signals of the pixel 105 and the pixel 106 are added together and output to an output line 110.

In the known solid state imaging apparatus, the number of capacitors for storing signals is the same number as that of pixels in each pixel addition group. Accordingly, a large number of capacitors are needed.

Therefore, in a solid state imaging apparatus, such as a super mega-pixel apparatus, which is used for a digital still camera, a digital video camera or the like and includes a large number of pixels, a very large number of capacitors are necessary.

For this reason, in a solid state imaging apparatus including a large number of pixels, the configuration of the apparatus is complicated and it is also difficult to reduce the size of the apparatus.

SUMMARY OF THE INVENTION

In view of the above-described problems, it is an object of the present invention to provide a solid state imaging apparatus which allows reduction in the number of capacitors for storing pixels signals.

To achieve the object, a first solid state imaging apparatus according to the present invention is directed to a solid state imaging apparatus which includes a plurality of pixels two-dimensionally arranged in the row direction and the column direction and in which every two of the plurality of pixels in the row direction or the column direction that are adjacent to each other include color filters of different colors, respectively. The solid state imaging apparatus is characterized in that the apparatus includes a plurality of signal mixture means, each of the plurality of signal mixture means being provided for each same-row and same-color pixel group consisting of ones of the plurality of pixels which are included in a pixel mixture unit to be a subject of pixel signal mixture, which are located in the same row, and which include color filters of the same color, and each of the plurality of signal mixture means stores pixel signals from the pixels included in the same-row and same-color pixel group and mixes the pixel signals together.

In the first solid state imaging apparatus of the present invention, the number of capacitors for storing pixel signals can be reduced. Therefore, it is possible to simplify the configuration of the solid state imaging apparatus and also to reduce the size of the solid state imaging apparatus.

In the first solid state imaging apparatus of the present invention, it is preferable that said each signal mixture means includes a plurality of capacitors which are provided so that the number of the plurality of capacitors is the same as that of the same-row and same-color pixel groups included in the pixel mixture unit and a plurality of switches for guiding respective signals output from the plurality of capacitors to a shared output line.

Thus, it is possible to more reliably simplify the configuration of the solid state imaging apparatus and also to reduce the size of the solid state imaging apparatus.

A second solid state imaging apparatus according to the present invention is directed to a solid state imaging apparatus which includes a plurality of pixels two-dimensionally arranged in the row direction and the column direction and including respective color filters and in which colors of the color filters are two-dimensionally arranged so that two colors in two rows or two columns as a unit repeatedly appear. The solid state imaging apparatus is characterized in that the apparatus includes arranging means for grouping the plurality of pixels into pixel mixture units each of which consists of p×q pixels included in an area of p rows (where p=4n+1, n is a natural number) and q columns (where q=4m+1, m is a natural number), setting pixels constituting each of the pixel mixture units and located in even-numbered rows and columns from a center pixel at a center in the row and column directions so as to include color filters of the same color, and two-dimensionally arranging the pixel mixture units so that each of the pixel mixture units is shifted by (p+1)/2 pixels in the row direction and by (q+1)/2 pixels in the column direction and each of the pixel mixture units subsequently overlaps with associated ones of the pixel mixture units, and signal mixture means for mixing pixel signals from ones of the pixels constituting each of the pixel mixture units which include color filters of the same color is provided in each of the pixel mixture units.

In the second solid state imaging apparatus of the present invention, the number of capacitors for storing pixel signals can be reduced. Therefore, it is possible to simplify the configuration of the solid state imaging apparatus and also to reduce the size of the solid state imaging apparatus.

DESCRIPTION OF THE PREFERRED EMBODIMENTS

First Embodiment

A solid state imaging apparatus according to a first embodiment of the present invention will be described with reference to FIGS. 1 through 4.

In the first embodiment, a solid state imaging apparatus includes a plurality of pixels two-dimensionally arranged in the row direction and the column direction, and in the apparatus, every two of the plurality of pixels that are adjacent to each other in the row direction or the column direction include color filters of different colors, respectively.

The solid state imaging apparatus of the first embodiment includes signal mixture means provided for each same-row and same-color pixel group consisting of ones of the plurality of pixels two-dimensionally arranged which are included in a pixel mixture unit to be a subject of pixel signal mixture, which are located in the same row, and which include color filters of the same color.

Figure 1:
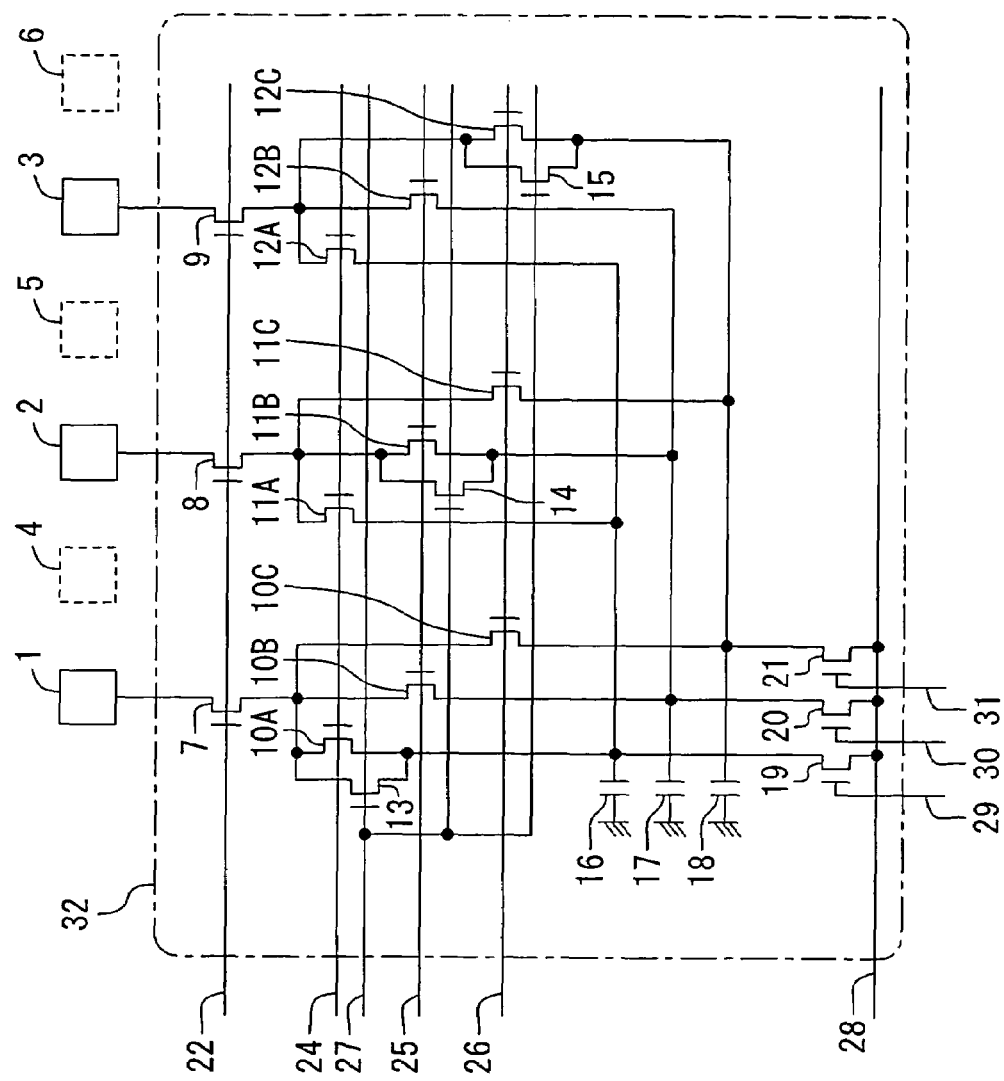
FIG. 1 is a diagram illustrating the configuration of a signal mixture circuit in a solid state apparatus according to a first embodiment of the present invention.

FIG. 1 is a diagram of a circuit configuration of the signal mixture means. More specifically, FIG. 1 illustrates the configuration of a pixel signal mixture circuit 32 for mixing pixel signals obtained in pixels included in a pixel mixture unit and having color filters of the same color. In FIG. 1, each of the reference numerals 1, 2 and, 3 denotes a same-row and same-color pixel group consisting of pixels which are included in a pixel mixture unit, are located in the same row, and have color filters of the same color. For example, a same-row and same-color pixel group 1, a same-row and same-color pixel group 2 and a same-row and same-color pixel group 3 are located in different rows, respectively, and each of the same-row and same-color pixel groups 1, 2 and 3 consists of a plurality of pixels (e.g., three pixels) including color filters of the same color. Moreover, each of the reference numerals 4, 5 and 6 denotes a pixel group consisting of pixels which are included in the same pixel mixture unit as the same-row and same-color pixel groups 1, 2 and 3 are included in, but include color filters of different colors from that of the same-row and same-color pixel groups 1, 2 and 3.

In FIG. 1, each of the reference numerals 7, 8 and 9 denotes a transfer switch which is made of an MOS transistor and transmits pixel signals generated in pixels included in the same-row and same-color pixel groups 1, 2 and 3. The transfer switches 7, 8 and 9 are controlled by a gate signal line 22. Moreover, each of the reference numerals 10A, 10B, 10C, 11A, 11B, 11C, 12A, 12B and 12C denotes a transmission switch made of an MOS transistor. The transmission switches 10A, 11A and 12A are controlled by a gate signal line 24, the transmission switches 10B, 11B and 12B are controlled by a gate signal line 25 and the transmission switches 10C, 11C and 12C are controlled by a gate signal line 26. Moreover, each of the reference numerals 13, 14 and 15 denotes a transmission switch made of an MOS transistor. The transmission switches 13, 14 and 15 are controlled by a gate signal line 27. Moreover, each of the reference numerals 16, 17 and 18 denotes a capacitor for storing signal charges. The capacitors 16, 17 and 18 sequentially store signal charges generated in pixels included in the same row and color group 1, 2 and 3. Moreover, each of the reference numerals 19, 20 and 21 denotes a transmission switch which is made of an MOS transistor and transmits signal charges stored in the capacitors 16, 17 and 18 to an output line 28. The transmission switches 19, 20 and 21 are controlled by gate signal lines 29, 30 and 31, respectively.

Figure 2:
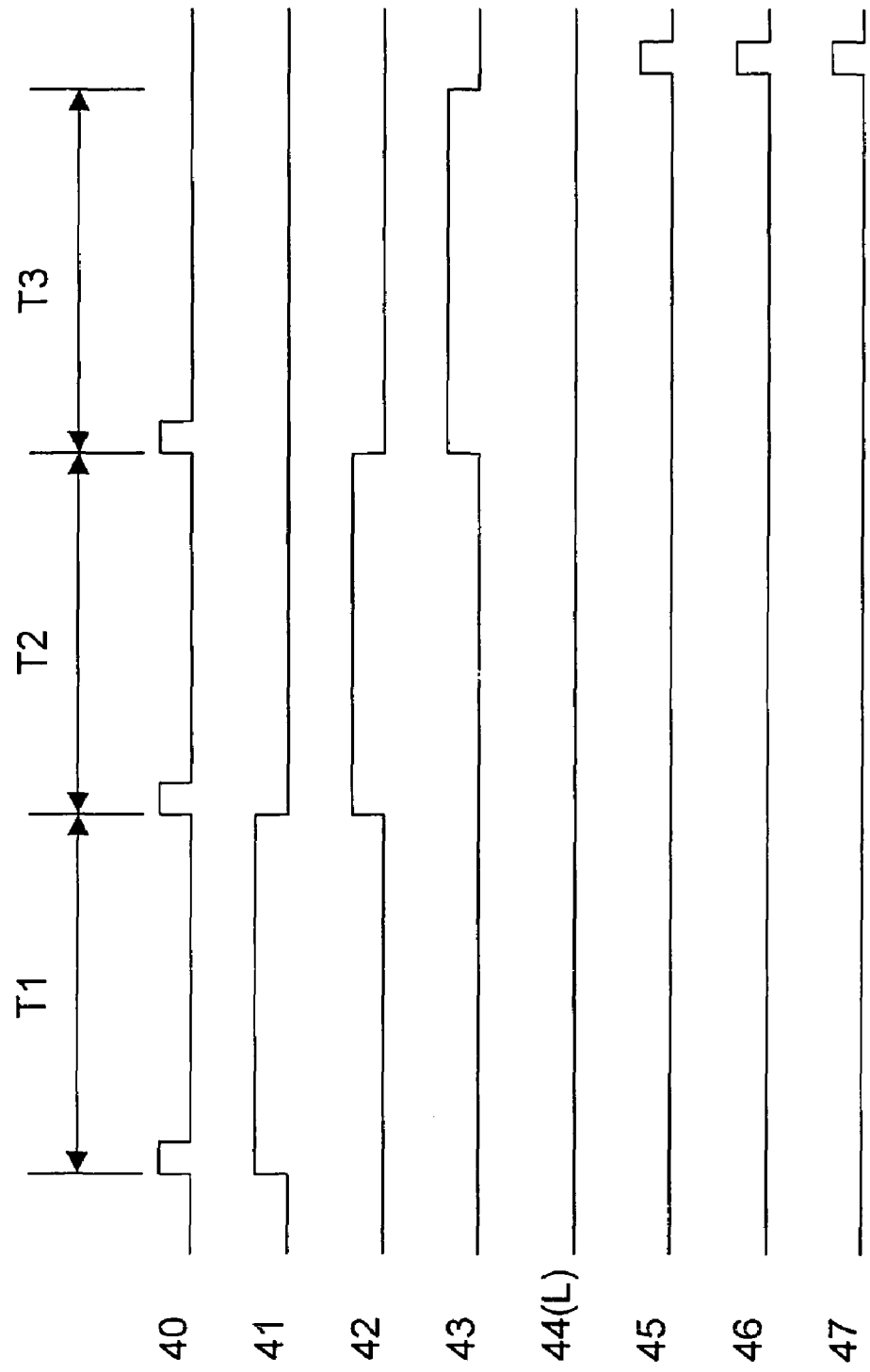
FIG. 2 is a timing chart in the case where the pixel signal mixture circuit in the first embodiment performs a mixture operation of mixing pixel signals.

FIG. 2 is a timing chart of a mixture operation in the case where pixel signals are mixed in the pixel signal mixture circuit 32. In FIG. 2, the reference numeral 40 denotes a signal applied to the gate signal line 22 for controlling the transmission switches 7, 8 and 9. The reference numerals 41, 42 and 43 denote signals applied to the gate signal lines 24, 25 and 26, respectively. The gate signal line 24 controls the transmission switches 10A, 11A and 12A, the gate signal line 25 controls the transmission switches 10B, 11B and 12B and the gate signal line 26 controls the transmission switches 10C, 11C and 12C. Moreover, the reference numeral 44 denotes a signal applied to the gate signal line 27 for controlling the transmission switches 13, 14 and 15, and the signal 44 is always set to be a low level during a mixture operation. Moreover, the reference numerals 45, 46 and 47 denote signals applied to the gate signal lines 29, 30 and 31, respectively. The signals 29, 30 and 31 are at the same level.

First, in a period T1, the signal 40 turns to a high level, and then the signal 41 becomes a high level. Thus, pixel signals from ones of pixels included in the same-row and same-color pixel groups 1, 2 which are located in the first column are output and then are stored in the capacitor 16. That is to say, pixel signals from pixels of the same-row and same-color pixel group 1 located in the first column are stored in the capacitor 16 via the transfer switch 7 and transmission switch 10A, pixel signals from pixels of the same-row and same-color pixel group 2 located in the first column are stored in the capacitor 16 via the transfer switch 8 and the transmission switch 11A, and pixel signals from pixels of the same-row and same-color pixel group 3 located in the first column are stored in the capacitor 16 via the transfer switch 9 and the transmission switch 12A.

Next, in a period T2, the signal 40 turns to a high level, and then the signal 42 becomes a high level. Thus, pixel signals from ones of the pixels included in the same-row and same-color pixel groups 1, 2 and 3 which are located in a second column are output and then are stored in the capacitor 17. That is to say, pixel signals from the pixels of the same-row and same-color pixel group 1 located in the second column are stored in the capacitor 17 via the transfer switch 7 and the transmission switch 10B, pixel signals from the pixels of the same-row and same-color pixel group 2 located in the second column are stored in the capacitor 17 via the transfer switch 8 and the transmission switch 11B, and pixel signals from the pixels of the same-row and same-color pixel group 3 located in the second column are stored in the capacitor 17 via the transfer switch 9 and the transmission switch 12B.

Next, in a period T3, the signal 40 turns to a high level, and then the signal 43 becomes a high level. Thus, pixel signals from ones of the pixels included in the same-row and same-color pixel groups 1, 2 and 3 which are located in a third column are output and then are stored in the capacitor 18. That is to say, pixel signals from the pixels of the same-row and same-color pixel group 1 located in the third column are stored in the capacitor 18 via the transfer switch 7 and the transmission switch 10C, pixel signals from the pixels of the same-row and same-color pixel group 2 located in the third column are stored in the capacitor 18 via the transfer switch 8 and the transmission switch 11C, and pixel signals from the pixels of the same-row and same-color pixel group 3 located in the third column are stored in the capacitor 18 via the transfer switch 9 and the transmission switch 12C.

Thereafter, the signals 45, 46 and 47 are simultaneously become high levels. Thus, pixel signals stored in the capacitors 16, 17 and 18 are output to an output line 28 via the transmission switches 19, 20 and 21.

According to this series of operations, pixel signals from, for example, nine pixels included in the same-row and same-color pixel group 1, 2 and 3 are mixed.

Figure 3:
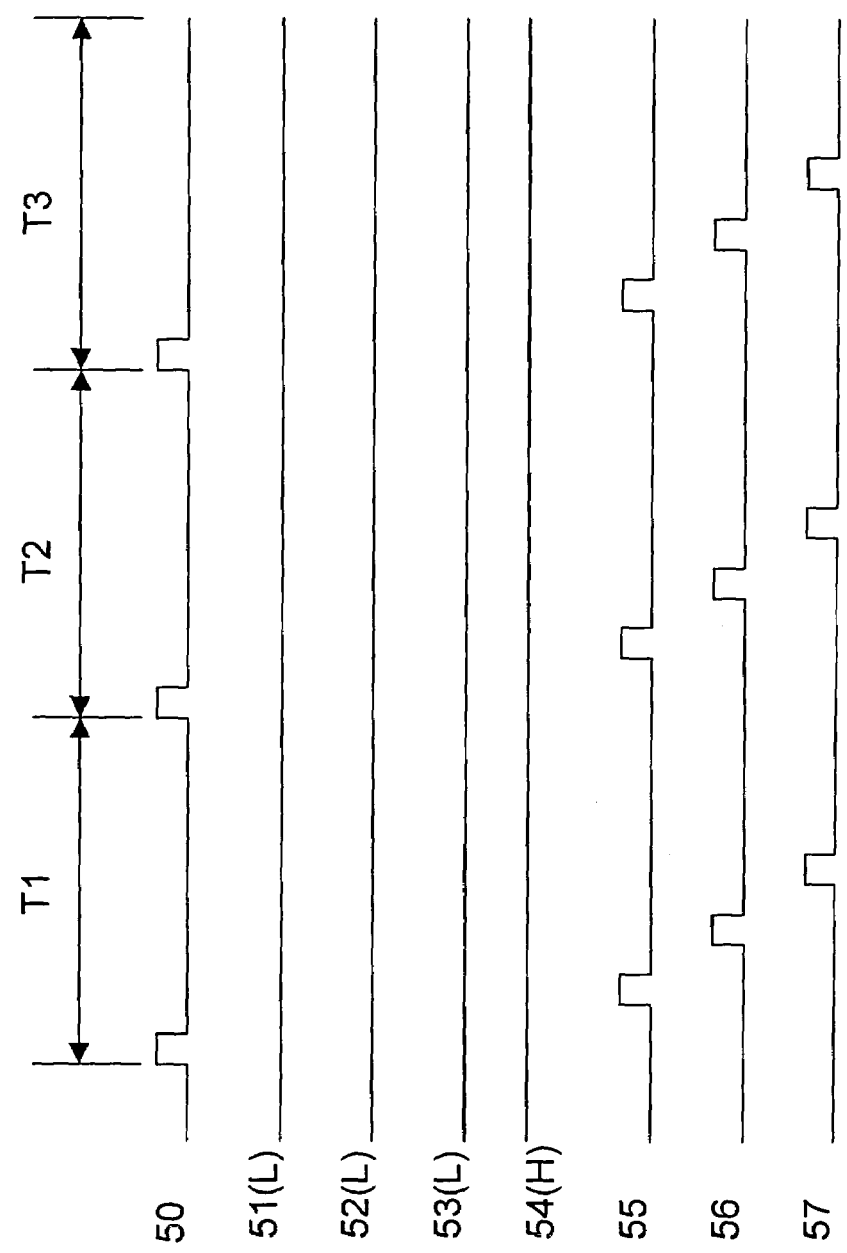
FIG. 3 is a timing chart in the case where the pixel signal mixture circuit in the first embodiment performs a regular operation of sequentially outputting pixel signals.

FIG. 3 is a timing chart of a regular operation in the case where pixel signals are sequentially output in the pixel signal mixture circuit 32. In FIG. 3, the reference numeral 50 denotes a signal applied to the gate signal line 22 for controlling the transfer switches 7, 8 and 9. The reference numerals 51, 52 and 53 denote signals applied to the gate signal lines 24, 25 and 26, respectively. The signals 24, 25 and 26 are always set to be a low level during a regular operation. Moreover, the reference numeral 54 denotes a signal applied to the gate signal line 27 for controlling the transmission switches 13, 14 and 15. The signal 54 is always set to be a high level during a regular operation. Moreover, the reference numerals 55, 56 and 57 denote signals applied to the gate signal lines 29, 30 and 31, respectively. The gate signal lines 29, 30 and 31 control the transmission switches 19, 20 and 21, respectively.

First, in a period T1, the signal 50 turns to a high level. Thus, pixel signals from the pixels in the first column of the same-row and same-color pixel group 1 are stored in the capacitor 16 via the transfer switch 7 and the transmission switch 13, pixel signals from the pixels in the first column of the same-row and same-color pixel group 2 located are stored in the capacitor 17 via the transfer switch 8 and the transmission switch 14, and pixel signals from the pixels in the first column of the same-row and same-color pixel group 3 are stored in the capacitor 18 via the transfer switch 9 and the transmission switch 15. Thereafter, the signals 55, 56 and 57 are sequentially become high levels, so that pixel signals stored in the capacitors 16, 17 and 18 are sequentially output to the output line 28 via the transmission switches 19, 20 and 21.

Next, in a period T2, the signal 50 turns to a high level. Thus, pixel signals from the pixels in the second column of the same-row and same-color pixel group 1 are stored in the capacitor 16 via the transfer switch 7 and the transmission switch 13, pixel signals from the pixels in the second column of the same-row and same-color pixel group 2 are stored in the capacitor 17 via the transfer switch 8 and the transmission switch 14, and pixel signals from the pixels in the second column of the same-row and same-color pixel group 3 are stored in the capacitor 18 via the transfer switch 9 and the transmission switch 15. Thereafter, the signals 55, 56 and 57 are sequentially become high levels, so that pixel signals stored in the capacitors 16, 17 and 18 are sequentially output to the output line 28 via the transmission switches 19, 20 and 21.

Next, in a period T3, the signal 50 turns to a high level. Thus, pixel signals from the pixels in the third column of the same-row and same-color pixel group 1 are stored in the capacitor 16 via the transfer switch 7 and the transmission switch 13, pixel signals from the pixels in the third column of the same-row and same-color pixel group 2 are stored in the capacitor 17 via the transfer switch 8 and the transmission switch 14, and pixel signals in the third column from the pixels of the same-row and same-color pixel group 3 are stored in the capacitor 18 via the transfer switch 9 and the transmission switch 15. Thereafter, the signals 55, 56 and 57 are sequentially become high levels, so that pixel signals stored in the capacitors 16, 17 and 18 are sequentially output to the output line 28 via the transmission switches 19, 20 and 21.

According to this series of operations, pixel signals from, for example, nine pixels included in the same-row and same-color pixel group 1, 2 and 3 are sequentially output.

Figure 4:
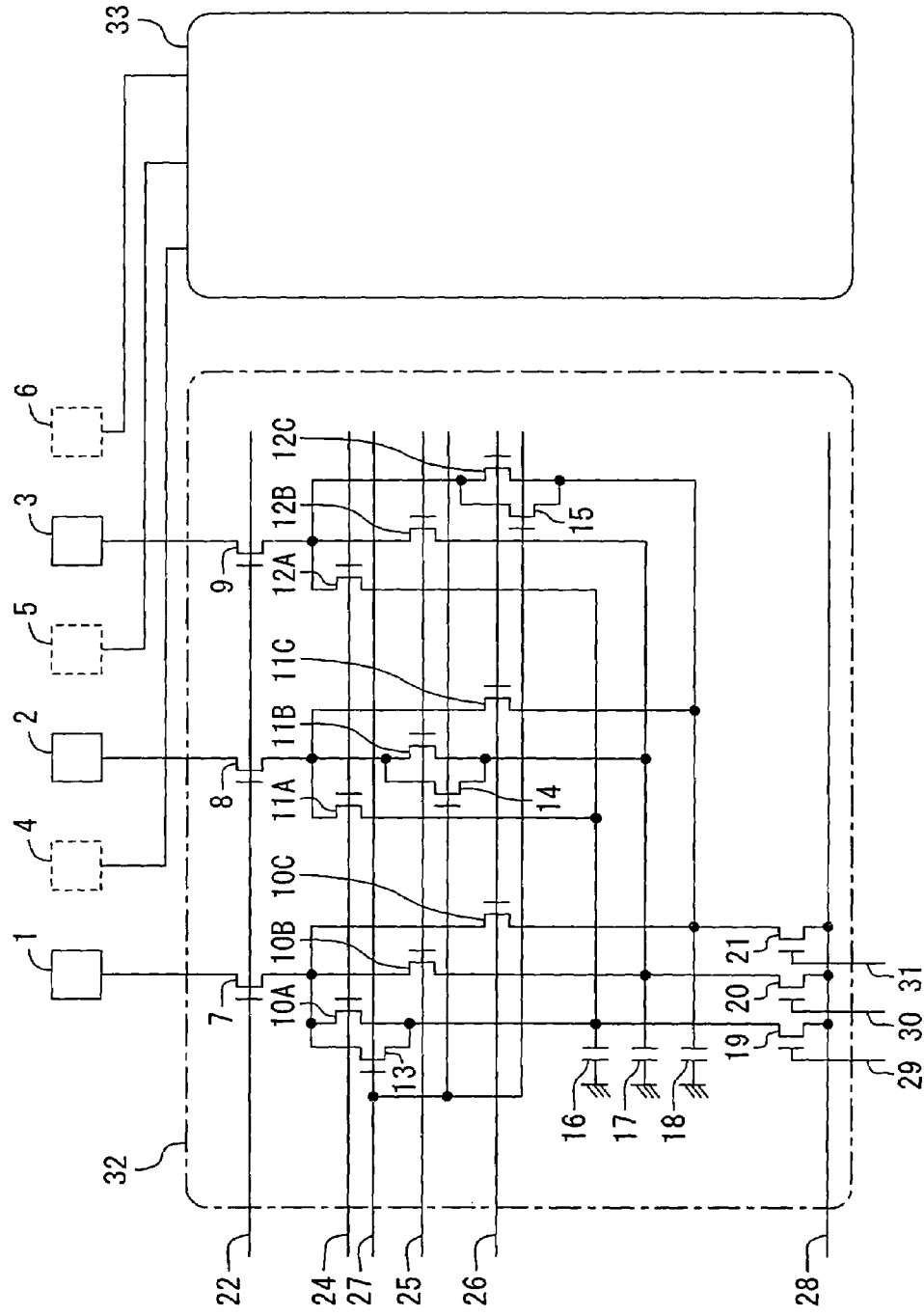
FIG. 4 is a diagram illustrating a configuration of the solid state imaging apparatus of the first embodiment in the case where the apparatus includes a plurality of pixel signal mixture circuits.

FIG. 4 is a diagram illustrating a configuration of a solid state imaging apparatus in which a pixel signal mixture circuit 33 is located to be adjacent to the pixel signal mixture circuit 32. The pixel signal mixture circuit 33 is a circuit for mixing pixel signals obtained in pixels included in the same-row and same-color pixel groups 4, 5 and 6, each of which consists of pixels included in the same pixel mixture unit in which the same-row and same-color pixel groups 1, 2 and 3 are included but having color filters of different colors from those of the same-row and same-color pixel groups 1, 2 and 3. Note that the configuration and operation of the pixel signal mixture circuit 33 are the same as those of the pixel signal mixture circuit 32. Therefore, description of the configuration and operation thereof will be omitted.

Second Embodiment

Hereinafter, a solid state imaging apparatus according to the second embodiment of the present invention will be described with reference to FIGS. 5 through 7.

Figure 5:
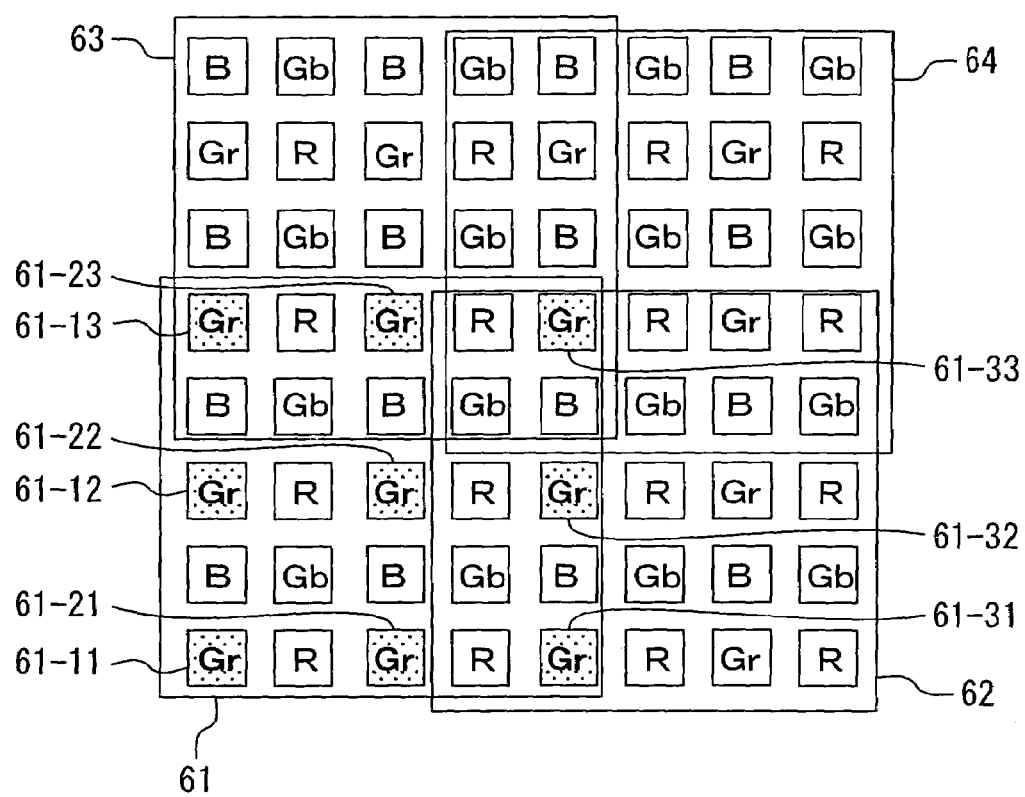
FIG. 5 is an illustration of an arrangement of pixels in a solid state imaging apparatus according to a second embodiment.

FIG. 5 is an illustration of an arrangement of pixels in the solid state imaging apparatus according to the second embodiment. In the solid state imaging apparatus, a plurality of pixels are two-dimensionally arranged in the row direction and the column direction, the plurality of pixels include respective color filters, and colors of the color filters are two-dimensionally arranged so that colors in two rows or two columns as a unit repeatedly appear.

The plurality of pixels are grouped into pixel mixture units each of which consists of p×q pixels included in an area formed of p rows (where p=4n+1, n is a natural number) and q columns (where q=4m+1, n is a natural number). Pixels constituting each of the pixel mixture units and located in even-numbered rows and columns from a center pixel at a center in the row and column directions are set so as to include color filters of the same color.

Moreover, by shifting each of the pixel mixture units by (p+1)/2 pixels in the row direction and by (q+1)/2 pixels in the column direction, the pixel mixture units are two-dimensionally arranged so that each of the pixel mixture units subsequently overlaps with associated ones of the pixel mixture units.

FIG. 5 shows how 64 pixels included in an area of eight rows and eight columns are two-dimensionally arranged. The 64 pixels are grouped into pixel mixture units each of which consists of 25 pixels included in an area of five rows and five columns (n=m=1, i.e., p=q=5) and by shifting each of the pixel mixture units by three pixels in the row direction and by three pixels in the column direction, each of the pixel mixture units subsequently overlaps with associated ones of the pixel mixture units.

Specifically, the 64 pixels are grouped into a first pixel mixture unit 61 using color filters (Gr), a second pixel mixture unit 62 using color filters (R), a third pixel mixture unit 63 using color filters (B) and a fourth pixel mixture unit 64 using color filters (Gb).

For example, the first pixel mixture unit 61 includes nine pixels including color filters (Gr) and constituting an area of three rows and three columns. These pixels are denoted by 61-11, 61-12, 61-13, 61-21, 61-22, 61-23, 61-31, 61-32 and 61-33. In the same manner, the second pixel mixture unit 62 includes nine pixels including color filters (R) and making up three rows and three columns, the third pixel mixture unit 63 includes nine pixels including color filters (B) and constituting an area of three rows and three columns, and the fourth pixel mixture unit 64 includes nine pixels including color filters (Gb) and constituting an area of three rows and three columns.

Figure 6:
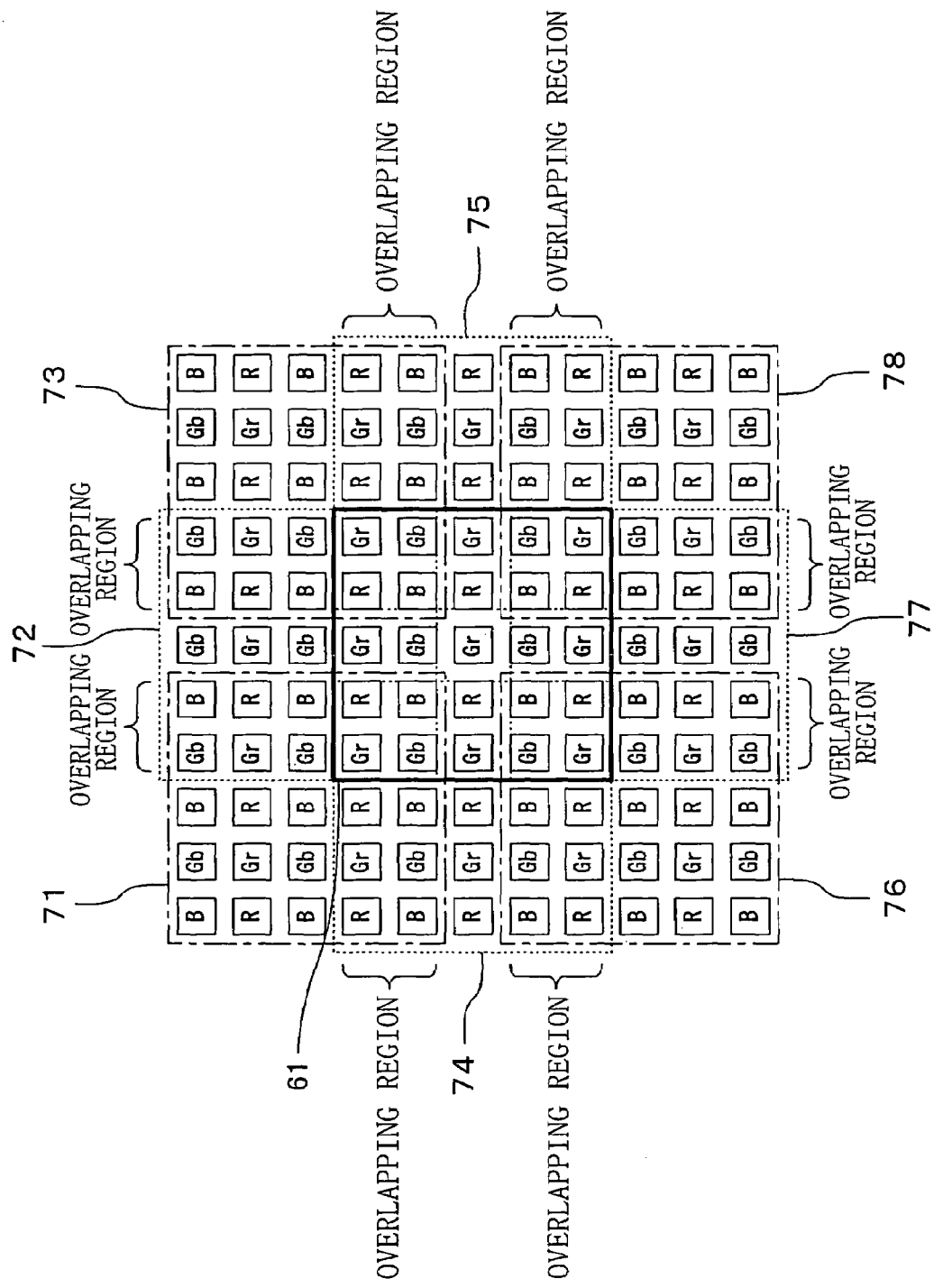
FIG. 6 is an illustration of an arrangement of pixel mixture units in the solid state imaging apparatus of the second embodiment.

FIG. 6 shows how the first pixel mixture unit 61 and eight pixel mixture units located around the first pixel mixture unit 61 are arranged. Specifically, around the first pixel mixture unit 61 using color filters (Gr), four third pixel mixture units 71, 73, 76 and 78 using color filters (B), two fourth pixel mixture units 72 and 77 using color filters (Gb), and two second pixel mixture units 74 and 75 using color filters (R) are arranged. Pixels in two rows or two columns of each of the pixel mixture units overlap with associated ones in two rows or two columns of an associated pixel mixture unit.

Figure 7:
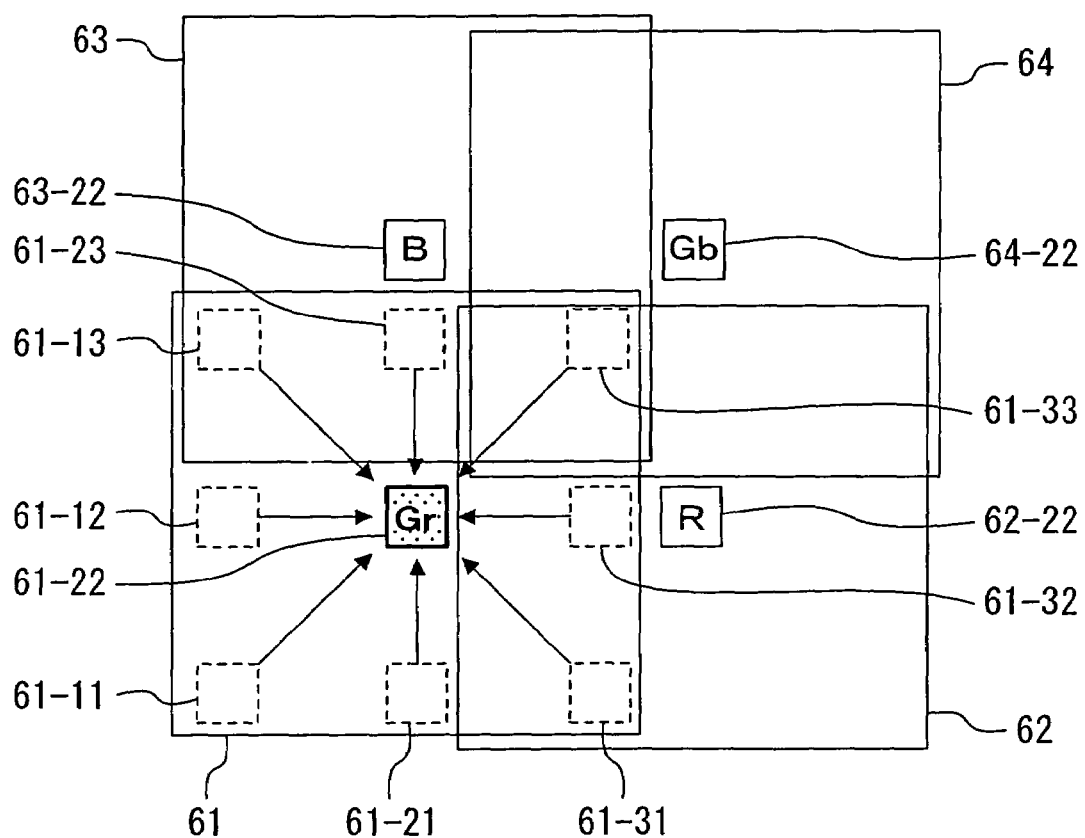
FIG. 7 is a conceptual view illustrating a method for mixing pixel signals in the solid state imaging apparatus of the second embodiment.
Figure 8:
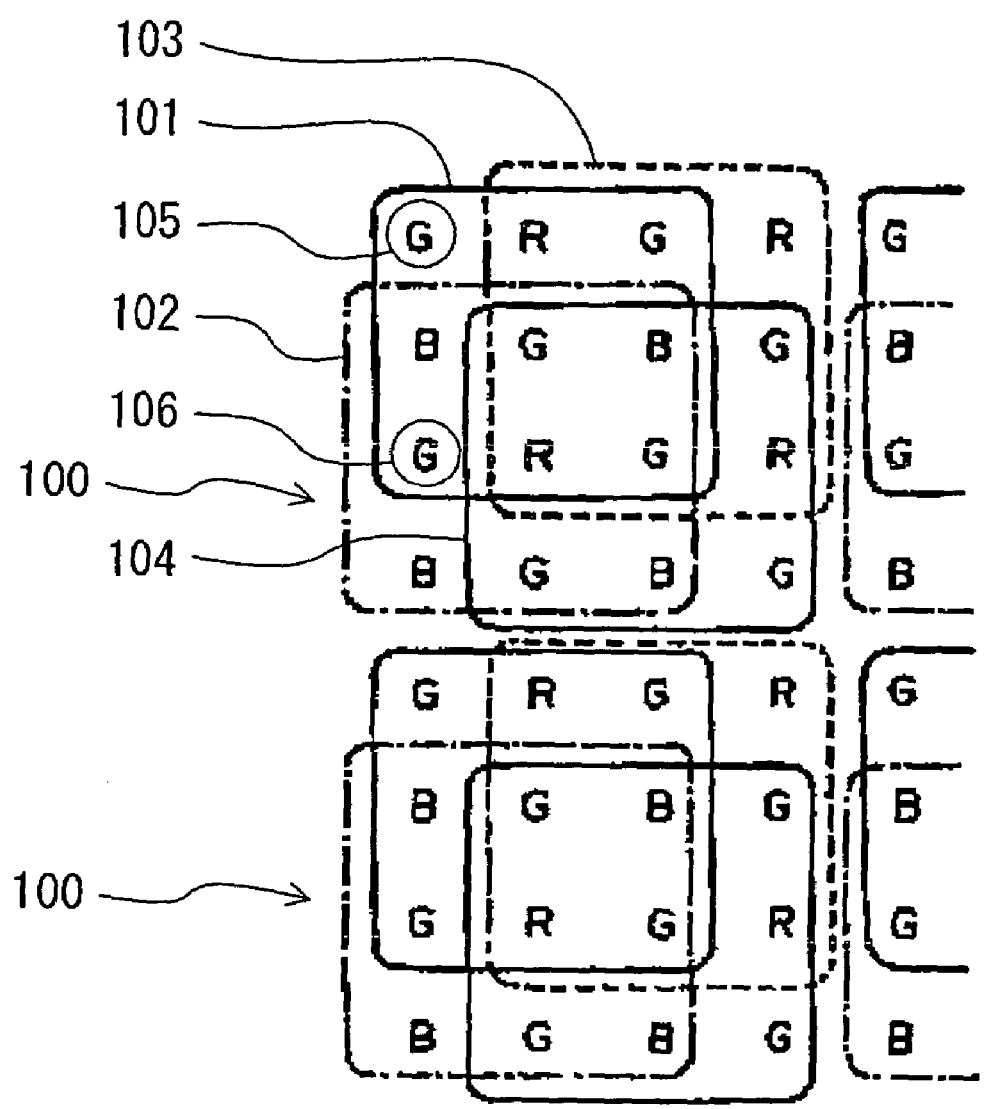
FIG. 8 is a conceptual view illustrating a method for mixing pixel signals in a known solid state imaging apparatus.
Figure 9:
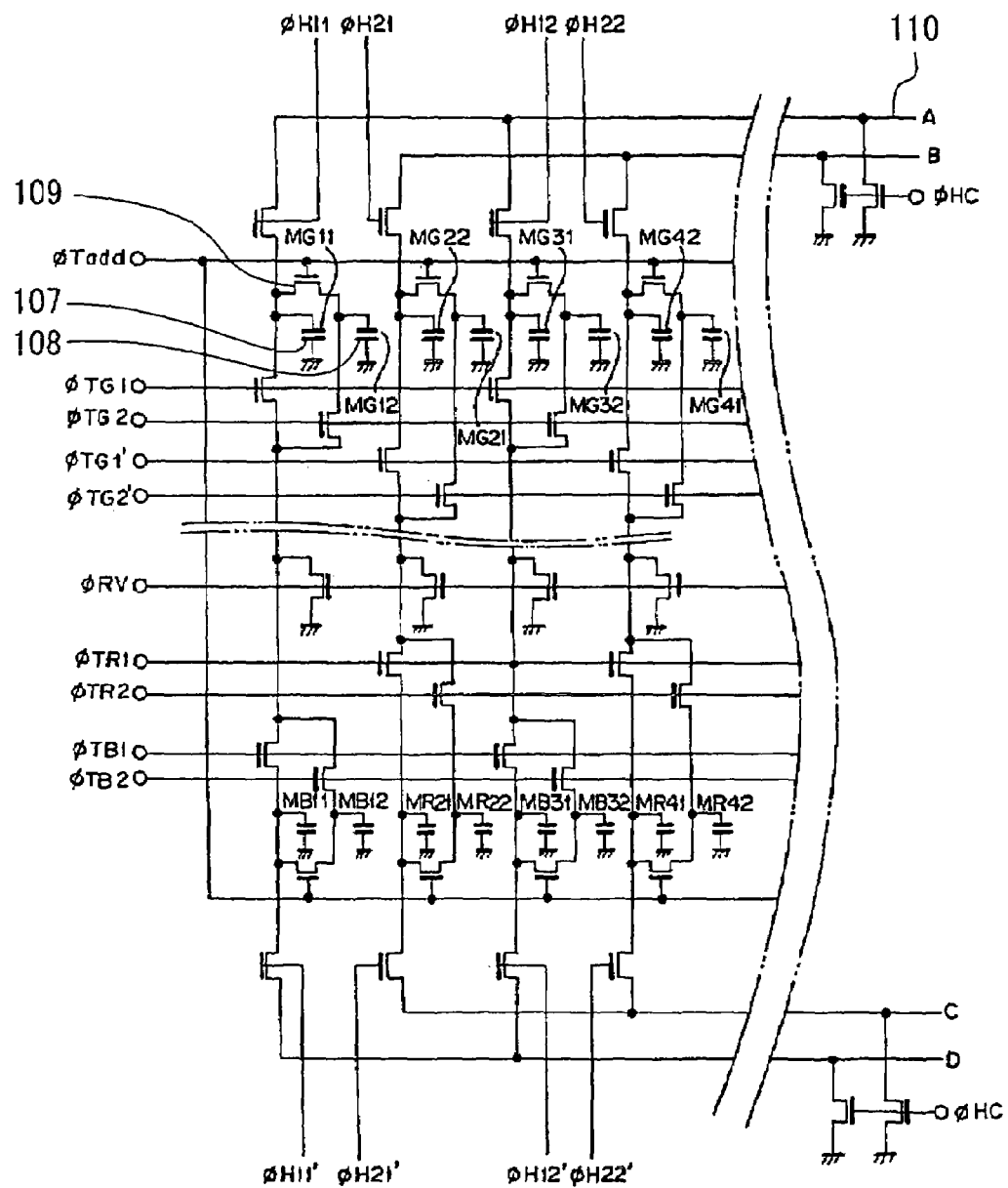
FIG. 9 is a diagram illustrating the configuration of a signal mixture circuit in the known solid state apparatus.

FIG. 7 shows a method for mixing nine signals generated in the nine pixels 61-11, 61-12, 61-13, 61-21, 61-22, 61-23, 61-31, 61-32 and 61-33 included in the first pixel mixture unit 61. Specifically, FIG. 7 illustrates a method in which a signal of the pixel 61-22 at the center of the first mixture unit 61 and eight signals generated in the other eight pixels 61-11, 61-12, 61-13, 61-21, 61-23, 61-31, 61-32 and 61-33 located around the pixel 61-22 are mixed together, so that a mixture signal Gr is output.

In the same manner, a signal of the pixel 62-22 at the center of the second mixture unit 62 and eight signals generated in the other eight pixels located around the pixel 62-22 are mixed together, so that a mixture signal R is output. A signal of the pixel 63-22 at the center of the third mixture unit 63 and eight signals generated in the other eight pixels located around the pixel 63-22 are mixed together, so that a mixture signal B is output. And a signal of the pixel 64-22 at the center of the fourth mixture unit 64 and eight signals generated in the other eight pixels located around the pixel 64-22 are mixed together, so that a mixture signal Gb is output.

Thus, by mixing signals of nine pixels included in each of the first through fourth pixel mixture units 61, 61, 63 and 64, the number of registers for storing pixel information can be reduced to ⅑ of that in the known apparatus without causing loss of information.

Moreover, the center gravity of a mixture signal obtained by mixing signals of the nine pixels is located so as to match to the center of the pixel mixture unit, and the pixel mixture units are two-dimensionally arranged so that pixels in two rows or two columns of each of the pixel mixture units overlap with associated ones in two rows or two columns of an associated pixel mixture unit. Accordingly, the arrangement of each mixture signal is the same as the original arrangement of color filters (i.e., the arrangement of color filters before a mixing operation).

Note that in the solid state imaging apparatus of the second embodiment, a circuit for mixing pixel signals and the operation thereof are the same as those of the first embodiment.

What is claimed is:

1. A solid state imaging apparatus which includes a plurality of pixels two-dimensionally arranged in the row direction and the column direction and including respective color filters and in which colors of the color filters are two-dimensionally arranged so that colors in two rows or two columns as a unit repeatedly appear,
the apparatus comprising arranging means for grouping the plurality of pixels into at least two pixel addition groups each of which consists of r×s pixels included in an area of r rows (where r=6n+2, n is a natural number) and s columns (where s=6m+2, m is a natural number) and grouping the r×s pixels into pixel mixture units each of which consists of p×q pixels included in an area of p rows (where p=4n+1, n is a natural number) and q columns (where q=4m+1, m is a natural number), setting pixels constituting each of the pixel mixture units and located in even-numbered rows and columns from a center pixel at a center in the row and column directions so as to include color filters of the same color, and two-dimensionally arranging the pixel mixture units so that each of the pixel mixture units is shifted by (p+1)/2 pixels in the row direction and by (q+1)/2 pixels in the column direction and each of the pixel mixture units subsequently overlaps with associated ones of the pixel mixture units,
wherein pixels in two rows or two columns of each pixel addition group overlap with associated pixels in two rows or two columns of an associated pixel addition group, and
wherein signal mixture means for mixing pixel signals from ones of the pixels constituting each of the pixel mixture units which include color filters of the same color is provided in each of the pixel mixture units.

2. The solid state imaging apparatus of claim 1, wherein the signal mixture means mixes a pixel signal of a pixel located at a center of each pixel mixture unit and a plurality of pixel signals generated in pixels located on the periphery of each pixel mixture unit.

3. The solid state imaging apparatus of claim 1, wherein the center of gravity of a mixture signal obtained by mixing the plurality of pixel signals is located so as to match to the center of each pixel mixture unit, and the center of gravity of the mixture signal is arranged equally and two-dimensionally.

4. The solid state imaging apparatus of claim 1, wherein each pixel addition group is comprised of sixty four pixels, and each pixel mixture unit is comprised of twenty five pixels.

* * * * *